US007744663B2

(12) United States Patent
Wallace

(10) Patent No.: US 7,744,663 B2
(45) Date of Patent: Jun. 29, 2010

(54) METHODS AND SYSTEMS FOR ADVANCED GASIFIER SOLIDS REMOVAL

(75) Inventor: Paul Steven Wallace, Katy, TX (US)

(73) Assignee: General Electric Company, Schenectady, NY (US)

( * ) Notice: Subject to any disclaimer, the term of this patent is extended or adjusted under 35 U.S.C. 154(b) by 478 days.

(21) Appl. No.: 11/356,266

(22) Filed: Feb. 16, 2006

(65) Prior Publication Data

US 2007/0186473 A1 Aug. 16, 2007

(51) Int. Cl.
*C01B 3/36* (2006.01)
*B01J 4/00* (2006.01)
*B01J 8/00* (2006.01)

(52) U.S. Cl. .................. 48/69; 422/232; 48/61
(58) Field of Classification Search ........ 48/62 R–62 A; 422/129–242
See application file for complete search history.

(56) References Cited

U.S. PATENT DOCUMENTS

| | | | | |
|---|---|---|---|---|
| 4,005,999 A | * | 2/1977 | Carlson | 95/221 |
| 4,481,014 A | * | 11/1984 | Dorling | 48/76 |
| 4,880,438 A | * | 11/1989 | Den Bleyker | 48/69 |
| 5,028,241 A | * | 7/1991 | Kooiman et al. | 48/87 |
| 5,251,433 A | | 10/1993 | Wallace | |
| 5,345,756 A | | 9/1994 | Jahnke et al. | |
| 6,004,379 A | | 12/1999 | Wallace et al. | |
| 6,269,286 B1 | | 7/2001 | Tse et al. | |
| 6,274,030 B1 | | 8/2001 | Wallace et al. | |
| 6,282,880 B1 | | 9/2001 | Wallace et al. | |
| 6,303,089 B1 | | 10/2001 | Wallace et al. | |
| 6,409,912 B1 | | 6/2002 | Wallace et al. | |
| 6,416,568 B1 | | 7/2002 | Wallace et al. | |
| 6,533,925 B1 | | 3/2003 | Wallace et al. | |
| 6,550,252 B2 | | 4/2003 | Wallace et al. | |
| 6,588,212 B1 | | 7/2003 | Wallace et al. | |
| 6,613,125 B1 | | 9/2003 | Wallace et al. | |
| 2002/0004533 A1 | | 1/2002 | Wallace et al. | |
| 2002/0068768 A1 | | 6/2002 | Wallace et al. | |
| 2002/0121093 A1 | | 9/2002 | Wallace et al. | |
| 2003/0041518 A1 | | 3/2003 | Wallace et al. | |
| 2008/0011247 A1 | * | 1/2008 | Alexander | 122/7 D |

* cited by examiner

*Primary Examiner*—Alexa D Neckel
*Assistant Examiner*—Imran Akram
(74) *Attorney, Agent, or Firm*—Armstrong Teasdale LLP

(57) ABSTRACT

Methods and systems for a gasifier solids removal system are provided. The system includes a down flow combustor including an inlet and an outlet and a combustion zone extending therebetween, the combustor configured to direct a flow of process material including syngas, flowable slag, and particulates in a first downward direction, a plurality of flow passages in serial flow communication including a first flow passage and a second flow passage, wherein the process material flow reverses direction flowing from the first passage to the second passage, and a plurality of entrainment separation stages in serial flow communication with at least one of the plurality of flow passages.

13 Claims, 4 Drawing Sheets

METHODS AND SYSTEMS FOR ADVANCED GASIFIER SOLIDS REMOVAL

BACKGROUND OF THE INVENTION

This invention relates generally to integrated gasification combined-cycle (IGCC) power generation systems, and more specifically to advanced methods and apparatus for removing solids from a gasifier.

At least some known IGCC systems include a gasification system that is integrated with at least one power producing turbine system. For example, known gasifiers convert a mixture of fuel, air or oxygen, steam, and/or limestone into an output of partially combusted gas, sometimes referred to as "syngas". The hot combustion gases are supplied to the combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides electrical power to the power grid.

At least some know gasification systems use three separate vessels, and a large radiant cooler to gasify bottoms, recover heat and remove solids from the syngas to make the syngas useable by other systems. Such additional vessels and ancillary equipment needed to support operation of the vessels add to the complexity, the capital expense, and operational manpower of the system.

BRIEF DESCRIPTION OF THE INVENTION

In one embodiment, a gasifier solids removal system includes a down flow combustor including an inlet and an outlet and a combustion zone extending therebetween, the combustor configured to direct a flow of process material including syngas, flowable slag, and particulates in a first downward direction, a plurality of flow passages in serial flow communication including a first flow passage and a second flow passage, wherein the process material flow reverses direction flowing from the first passage to the second passage, and a plurality of entrainment separation stages in serial flow communication with at least one of the plurality of flow passages.

In another embodiment, a method of removing solids from a process flow in a gasifier includes combusting a fuel in the gasifier such that a flow of products of combustion are generated, the products of combustion including particulate components and gaseous components, channeling a flow the products of combustion in a first direction, reversing the direction of flow of the products of combustion, and contacting the products of combustion with water to facilitate separating the particulate components of the products of combustion from the gaseous components of the products of combustion.

In yet another embodiment, a gasification system includes a pressure vessel including a combustor configured to direct products of combustion to an outlet passage, and a fuel injection system configured to inject a fuel into the combustor, wherein the pressure vessel further includes, a sump positioned proximate the outlet, a lockhopper adjacent the sump, the lockhopper configured to transfer solid combustion products from the combustor to an exterior of the pressure vessel, and a multi-stage entrainment separator positioned in the outlet passage.

DETAILED DESCRIPTION OF THE INVENTION

Figure 1:
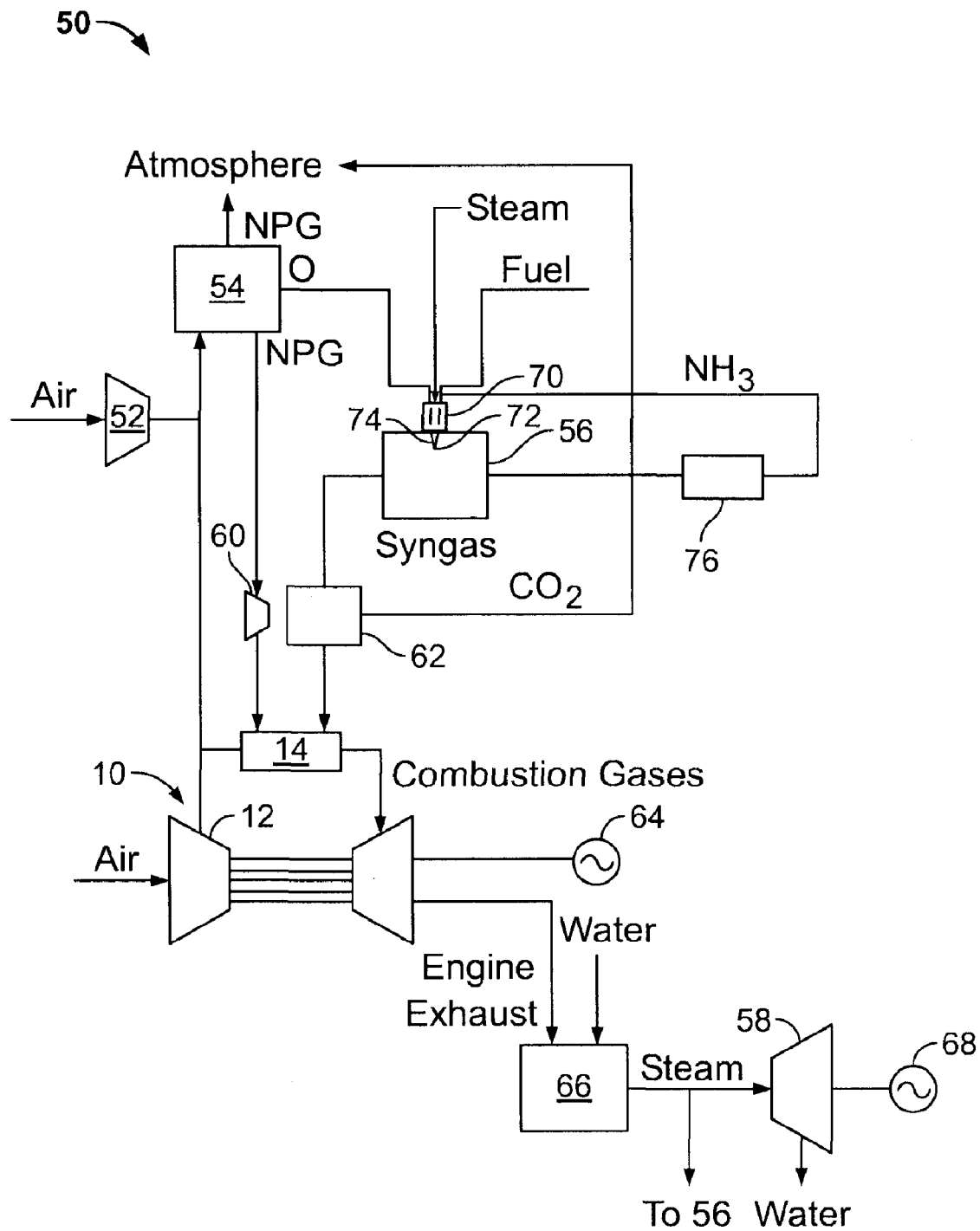
FIG. 1 is a schematic diagram of an exemplary known integrated gasification combined-cycle (IGCC) power generation system.

FIG. 1 is a schematic diagram of an exemplary integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and will be referred to herein as "nitrogen process gas". The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 52 may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 52 for generating the syngas.

Figure 2:
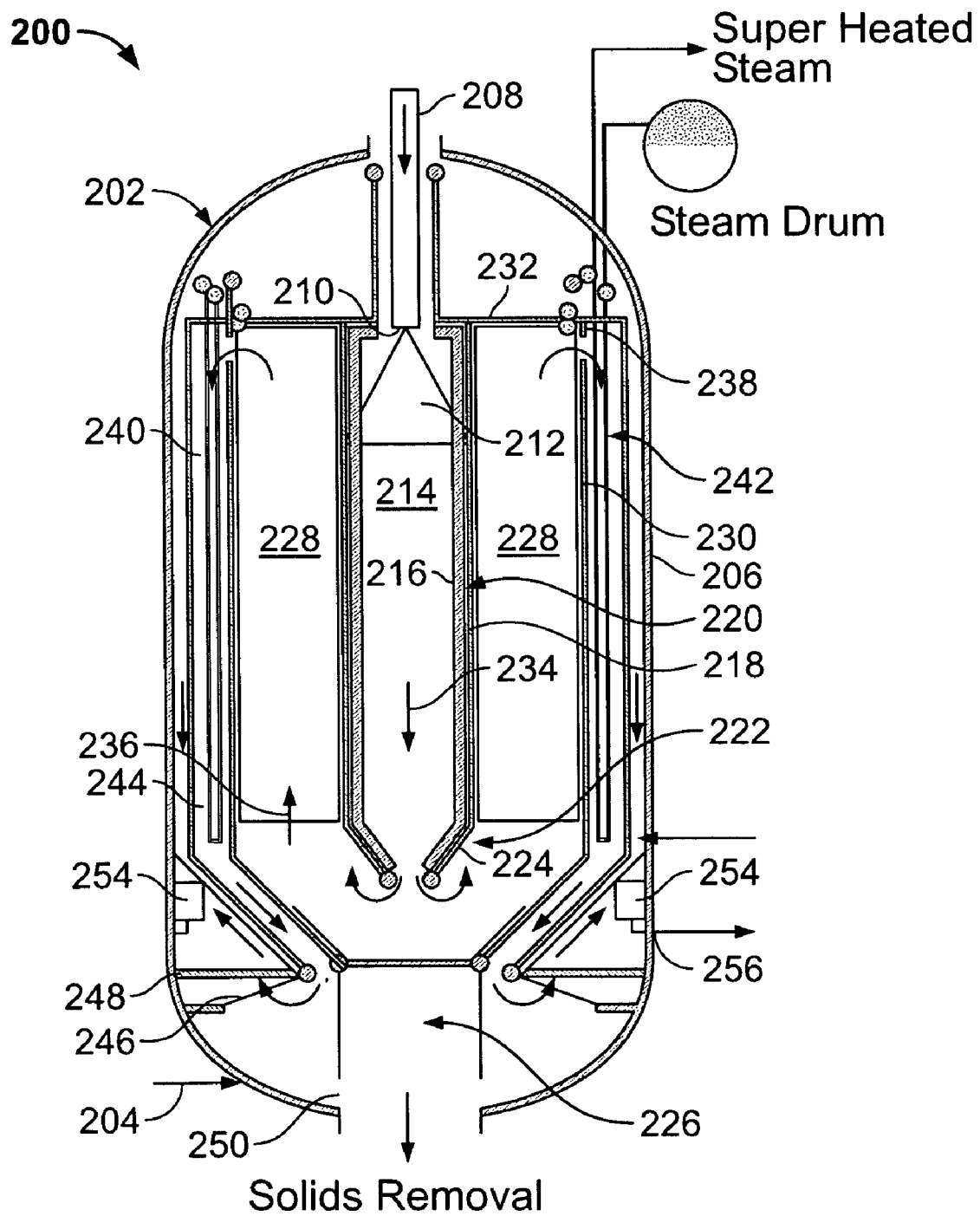
FIG. 2 is a schematic view of an exemplary embodiment of an advanced solids removal gasifier that may be used with the system shown in FIG. 1.

FIG. 2 is a schematic view of an exemplary embodiment of an advanced solids removal gasifier 200 that may be used with system 50 (shown in FIG. 1). In the exemplary embodiment, gasifier 200 includes an upper shell 202, a lower shell 204 and a substantially cylindrical vessel body 206 extending therebetween. A feed injector 208 penetrates upper shell 202 to channel a flow of fuel into gasifier 200. The fuel is transported through one or more passages in feed injector 208 and exits a nozzle 210 that directs the fuel in a predetermined pattern 212 into a combustion zone 214 in gasifier 200. The fuel may be mixed with other substances prior to entering nozzle 210 or may be mixed with other substances while exiting from nozzle 210. For example, the fuel may be mixed with fines recovered from a process of system 50 prior to entering nozzle 210 and the fuel may be mixed with an oxidant, such as air or oxygen at nozzle 210 or downstream of nozzle 210.

In the exemplary embodiment, combustion zone 214 is a vertically oriented substantially cylindrical space co-aligned and in serial flow communication with nozzle 210. An outer periphery of combustion zone 210 is defined by a refractory wall 216 comprising a structural substrate, such as an Incoloy pipe 218 and a refractory coating 220 configured to resist the effects of the relatively high temperature and high pressure contained within combustion zone 210. An outlet end 222 of refractory wall 216 includes a convergent outlet nozzle 224 configured to maintain a predetermined back pressure in combustion zone 214 while permitting products of combustion and syngas generated in combustion zone 214 to exit combustion zone 214. The products of combustion include gaseous byproducts, a slag formed generally on refractory coating 220, and fine particular carried in suspension with the gaseous byproducts.

After exiting combustion zone 214, the flowable slag and solid slag fall by gravity influence into a lockhopper 226 in bottom shell 204. Lockhopper 226 is maintained with a level of water that quenches the flowable slag into a brittle solid material that may be broken in smaller pieces upon removal from gasifier 200. Lockhopper 226 also traps approximately ninety percent of fine particulate exiting combustion zone 214.

In the exemplary embodiment, an annular first passage 228 at least partially surrounds combustion zone 214. First passage 228 is defined by refractory wall 216 at an inner periphery and a cylindrical shell 230 coaxially aligned with combustion zone 214 at a radially outer periphery of first passage 228. First passage 228 is closed at the top by a top flange 232. The gaseous byproducts and remaining ten percent of the fine particulate are channeled from a downward direction 234 in combustion zone 214 to an upward direction 236 in first passage 228. The rapid redirection at outlet nozzle 224 facilitates fine particulate and slag separation from the gaseous byproducts.

The gaseous byproducts and remaining ten percent of the fine particulate are transported upward through first passage 228 to a first passage outlet 238. During the transport of the gaseous byproducts through first passage 228, heat may be recovered from the gaseous byproducts and the fine particulate. For example, the gaseous byproducts enter first passage 228 at a temperature of approximately 2500° Fahrenheit and when exiting first passage 228 the temperature of gaseous byproducts is approximately 1800° Fahrenheit. The gaseous byproducts and fine particulates exit first passage 228 through first passage outlet 238 into a second annular passage 240 where the gaseous byproducts and fine particulates are redirected to a downward flow direction. As the flow of gaseous byproducts and the fine particulates is transported through second passage 240, heat may be recovered from the flow of gaseous byproducts and the fine particulates using for example, superheat tubes 242 that remove heat from the flow of gaseous byproducts and the fine particulates and transfer the heat to steam flowing through an inside passage of superheat tubes 242. For example, the gaseous byproducts enter second passage 240 at a temperature of approximately 1800° Fahrenheit and exit second passage 240 at a temperature of approximately 1500° Fahrenheit. When the flow of gaseous byproducts and the fine particulates reach a bottom end 244 of second passage 240 that is proximate bottom shell 204, second passage 240 converges toward lockhopper 226. At bottom end 244, the flow of gaseous byproducts and the fine particulates is channeled in an upward direction through a water spray 246 that desuperheats the flow of gaseous byproducts and the fine particulates. The heat removed from the flow of gaseous byproducts and the fine particulates tends to vaporize water spray 246 and agglomerate the fine particulates such that the fine particulates form a relatively larger ash clod that falls into lower shell 204. The flow of gaseous byproducts and the remaining fine particulates are channeled in a reverse direction and directed to an underside of a perforated plate 248 that forms an annular tray circumscribing bottom end 244. A level of water is maintained above perforated plate 248 to provide a contact medium for removing additional fine particulate from the flow of gaseous byproducts. As the flow of gaseous byproducts and the remaining fine particulates percolates up through the perforations in perforated plate 248, the fine particulates contact the water and are entrapped in the water bath and carried downward through the perforations into a sump of water in the bottom shell 204. A gap 250 between a bottom of lockhopper 226 and bottom shell 204 permits the fine particulates to flow through to lockhopper 226 where the fine particulates are removed from gasifier 200.

An entrainment separator 254 encircles an upper end of lower shell 204 above perforated plate 248 and the level of water above perforated plate 248. Entrainment separator 254 may be for example, a cyclonic or centrifugal separator comprises a tangential inlet or turning vanes that impart a swirling motion to the gaseous byproducts and the remaining fine particulates. The particulates are thrown outward by centrifugal force to the walls of the separator where the fine particulates coalesce and fall down a wall of the separator bottom shell 204. Additionally, a wire web is used to form a mesh pad wherein the remaining fine particulates impact on the mesh pad surface, agglomerate with other particulates drain off with the aid of a water spray by gravity to bottom shell 204. Further, entrainment separator can be of a blade type such as a chevron separator or an impingement separator. In the chevron separator, the gaseous byproducts pass between blades and are forced to travel in a zigzag pattern. The entrained particulates and any liquid droplets cannot follow the gas streamlines, so they impinge on the blade surfaces, coalesce, and fall back into bottom shell 204. Special features such as hooks and pockets can be added to the sides of the blades to facilitate improving particulates and liquid droplet capture. Chevron grids can be stacked or angled on top of one another to provide a series of separation stages. Impingement separators create a cyclonic motion as the gaseous byproducts and fine particulates pass over curved blades, imparting a spinning motion that causes the entrained particulates and any liquid droplets to be directed to the vessel walls, where the entrained particulates and any liquid droplets are collected and directed to bottom shell 204.

In the exemplary embodiment, entrainment separator is a chevron type separator, although other types of separators are contemplated and may be used in place of or in tandem with chevron type separators.

The flow of gaseous byproducts and any remaining fine particulates enter separator 254 where substantially all of the remaining entrained particulates and any liquid droplets are removed form the flow of gaseous byproducts. The flow of gaseous byproducts exits the gasifier through an outlet 256 for further processing.

Figure 3:
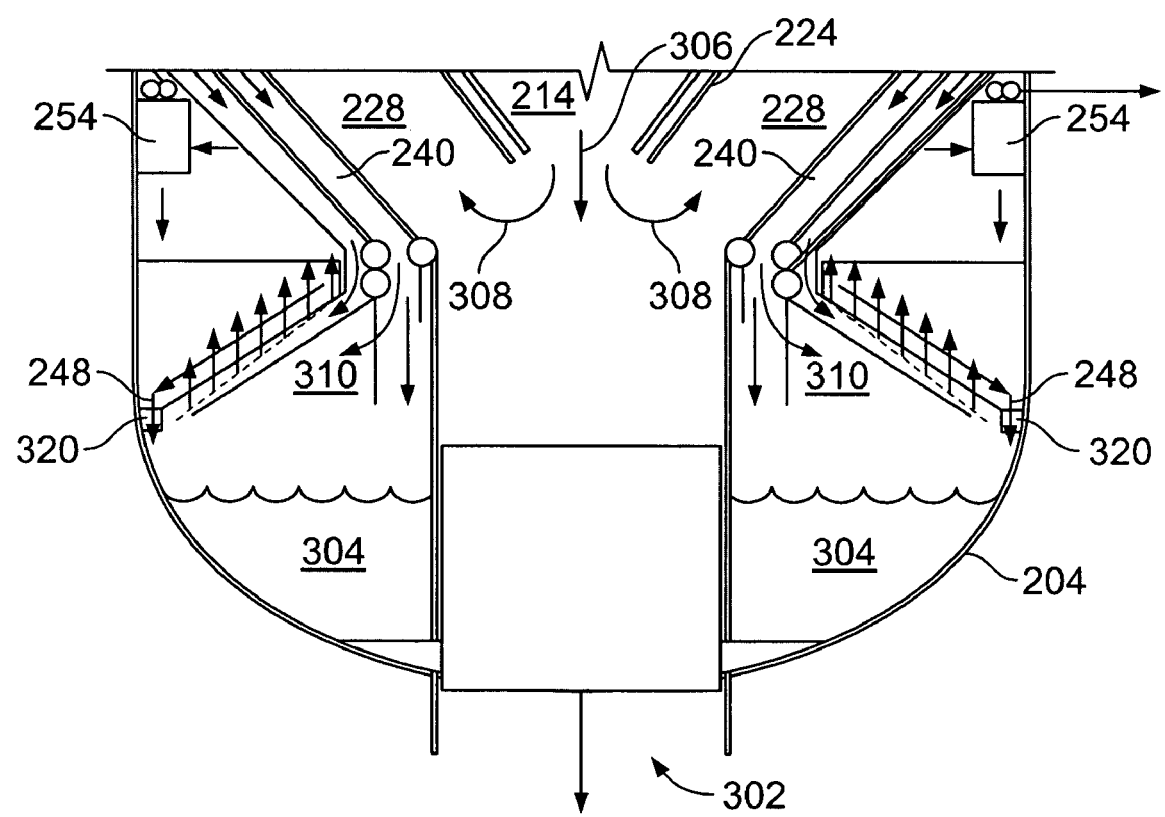
FIG. 3 is an enlarged cross-sectional view of the bottom shell assembly shown in FIG. 2.

FIG. 3 is an enlarged cross-sectional view of bottom shell 204 (shown in FIG. 2). In the exemplary embodiment, bottom shell 204 comprises a semi-hemispherically shaped body having a lockhopper exit 302 penetrating therethrough. Lock hopper 226 is a substantially cylindrical space that extends from the bottom of bottom shell 204 upward towards combustion zone outlet nozzle 224. Gap 250 extends at least partially about a circumference of lockhopper 226 proximate an intersection of lockhopper 226 with bottom shell 204. Gap 250 permits scale and fine particulates to pass into lockhopper 226 for removal from gasifier 200. A level of water is maintained in a sump 304 formed in the lower portion of bottom shell 204. The water in sump 304 entraps any fine particulate matter and transports it toward lockhopper exit 302.

Gaseous byproducts, slag, and fine particulate exit combustion zone 214 through outlet nozzle 224 in a downward direction 306. The gaseous byproducts from the reaction in combustion zone and approximately ten percent of the fine particulates reverse direction and are channeled in an upward direction 308 into first passage 228. The slag and approximately ninety percent of the fine particulate matter that fall due to gravity and/or are too heavy to reverse direction and be carried upward by the gaseous byproducts are captured in the water in lockhopper 226 and generally settle proximate penetration 302. The gaseous byproducts and remaining fine particulates are carried upward through first passage 228 and reverse direction exiting first passage 228. The gaseous byproducts and remaining fine particulates are carried downward in second passage 240 towards sump 304. The gaseous byproducts and remaining fine particulates are again channeled such that the flow is reversed as the gaseous byproducts and remaining fine particulates enter a spray zone 310 that facilitates desuperheating the gaseous byproducts and remaining fine particulates and vaporizing the spray. A portion of the remaining fine particulates are amalgamated by the spray and fall into sump 304. The gaseous byproducts and remaining fine particulates are directed upwards through perforated plate 248. A level of water is maintained above perforated plate 248 such that gaseous byproducts and remaining fine particulates percolating through the perforations in perforated plate 248 contact the water above perforated plate 248. At least a portion of the fine particulates become entrapped in the water and flow with a portion of the water through a drain 320 in perforated plate 248 to sump 304.

The gaseous byproducts and remaining fine particulates then are channeled upward towards entrainment separator 254. Substantially all of the remaining fine particulates are removed in entrainment separator 254. The fine particulates are washed from entrainment separator 254 using a spray that washes the trapped fine particulate from entrainment separator 254 into the water above perforated plate 248. Cleaned gaseous byproducts exit gasifier through outlet 256

Figure 4:
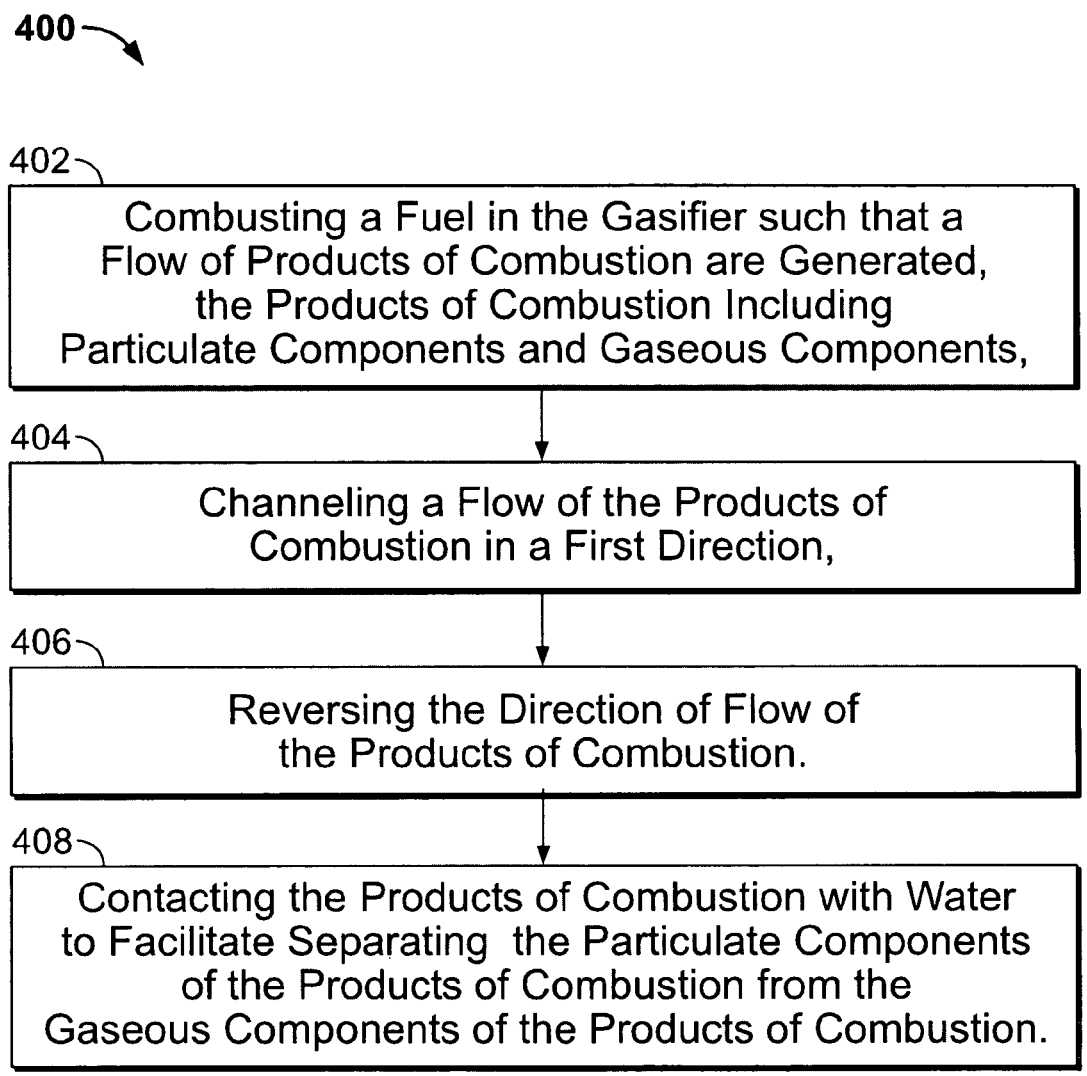
FIG. 4 is a flow chart of an exemplary method of removing solids from a process flow in a gasifier.

FIG. 4 is a flow chart of an exemplary method 400 of removing solids from a process flow in a gasifier. Method 400 includes combusting 402 a fuel in the gasifier such that a flow of products of combustion are generated, the products of combustion including particulate components and gaseous components, channeling 404 a flow the products of combustion in a first direction, reversing 406 the direction of flow of the products of combustion. Method 400 also includes contacting 408 the products of combustion with water to facilitate separating the particulate components of the products of combustion from the gaseous components of the products of combustion. In the exemplary embodiment, contacting the products of combustion with water includes spraying water into the flow of the products of combustion. The spray occurs as the flow of the products of combustion is reversing direction and simultaneously reducing velocity. The spray facilitates desuperheating the products of combustion, amalgamating particles entrained in the flow, and vaporizing at least a portion of the spray. The flow of the products of combustion is channeled up through a perforated bottom of a water filled trough where more particulate is trapped in the water and flushed into the sump. Finally, the flow of the products of combustion is channeled to a separator that directs the flow through a tortuous path or slings the flow by cyclonic action where any remaining particulate in the flow is removed and flushed into the sump. The sump is in flow communication with the lockhopper near the bottom of the lockhopper. Scale and particulates flushed to the sump are directed to the lockhopper through a gap between the bottom of the lockhopper and the bottom shell of the gasifier. The gaseous products of combustion are removed from the gasifier through a header extending around an inner periphery of the gasifier and in flow communication with the separator.

Exemplary embodiments of gasification systems and methods of removing solids from a gasifier are described above in detail. The gasification system components illustrated are not limited to the specific embodiments described herein, but rather, components of each system may be utilized independently and separately from other components described herein. For example, the gasification system components described above may also be used in combination with different IGCC system components.

While the invention has been described in terms of various specific embodiments, those skilled in the art will recognize that the invention can be practiced with modification within the spirit and scope of the claims.

What is claimed is:

1. A gasifier comprising:
a shell comprising a gas output passage defined through a lower portion of said shell;
a down flow combustor defined within said shell, said combustor comprising an inlet, an outlet, and a combustion zone extending between said inlet and said outlet, said combustor configured to direct a flow of process material comprising syngas, flowable slag, and particulates in a downward direction;
a plurality of annular flow passages in serial flow communication and positioned substantially concentrically about said combustor, said plurality of passages comprising a first flow passage and a second flow passage, said first and second flow passages positioned in series between said combustor and said shell along a radius of said shell, wherein the process material flows in an upward direction through the first passage into the second passage;

an up-flow passage defined at least partially between said shell and an outer wall of said second flow passage and oriented such that the process material flows in a downward direction through the second passage and into the up-flow passage; and a plurality of entrainment separation stages in serial flow communication with at least the second flow passage, at least one of said plurality of entrainment separation stages is positioned within said up-flow passage, at least one stage of said plurality of entrainment separation stages comprising a water trough at least partially circumscribing said shell between said second passage and said up-flow passage, said water trough having a bottom formed of a perforated plate and configured to maintain a level of water above said bottom, wherein substantially all the flow of process material from said second passage flows through perforations in said bottom and said level of water.

2. A gasifier in accordance with claim 1 further comprising a lockhopper proximate said combustor outlet, said lockhopper configured to receive the flowable slag and a portion of the particulates.

3. A gasifier in accordance with claim 1 further comprising a lockhopper proximate said combustor outlet, said lockhopper configured to transport the flowable slag and a portion of the particulates outside said gasifier shell while maintaining a level of water in said lockhopper.

4. A gasifier in accordance with claim 1 further comprising a bottom shell assembly comprising a bottom shell, a sump within said bottom shell, and a lockhopper adjacent said sump and oriented in alignment with said combustor outlet, said sump and said lockhopper coupled in flow communication by a gap between said bottom shell and a sidewall of said lockhopper.

5. A gasifier in accordance with claim 1 wherein the process material flows in the downward direction through said second flow passage, said system further comprising a water spray proximate an outlet of said second flow passage, said spray configured to at least one of desuperheat the flow of the process material exiting said second flow passage, amalgamate particles entrained in the flow of the process material, and vaporize at least a portion of the spray.

6. A gasifier in accordance with claim 1, wherein said plurality of entrainment separation stages comprise an entrainment separator comprising at least one of a cyclonic separator, a centrifugal separator, a mesh separator, a chevron separator, and an impingement separator.

7. A gasifier in accordance with claim 1, wherein said plurality of entrainment separation stages further comprise a water spray proximate an outlet of the second flow passage and an entrainment separator coupled in serial flow communication.

8. A gasification system comprising:

a pressure vessel comprising an outlet passage at a bottom portion of said pressure vessel;

a combustor within said pressure vessel, said combustor configured to direct products of combustion to said outlet passage; and a fuel injection system configured to inject a fuel into said combustor;

wherein said pressure vessel further comprises:

a plurality of annular flow passages in serial flow communication and positioned substantially concentrically about said combustor, said plurality of passages comprising a first flow passage and a second flow passage, said first and second flow passages coupled in series between said combustor and said pressure vessel along a radius of said pressure vessel, wherein process materials flow in an upward direction through said first passage and into said second passage;

a sump positioned proximate the outlet passage;

a lockhopper adjacent said sump, said lockhopper configured to transfer solid combustion products from said combustor to an exterior of said pressure vessel; and an up-flow passage defined at least partially between a wall of said pressure vessel and an outer wall of said second flow passage, said up-flow passage oriented such that process materials are discharged downwardly direction through the second passage and into the up-flow passage, said up-flow passage comprising a multi-stage entrainment separator positioned within said up-flow passage, at least one stage of said plurality of entrainment separation stages comprising a water trough at least partially circumscribing said shell between said second passage and said up-flow passage, said water trough having a bottom formed of a perforated plate and configured to maintain a level of water above said bottom, wherein substantially all the flow of process material from said second passage flows through perforations in said bottom and said level of water.

9. A gasification system in accordance with claim 8 wherein said multi-stage entrainment separator comprises at least one of a spray and a mesh separator.

10. A gasification system in accordance with claim 8 wherein said multi-stage entrainment separator further comprises a spray and a mesh separator in serial flow communication.

11. A gasification system in accordance with claim 8 wherein at least one of said flow passages is configured to reverse a flow of the products of combustion and substantially simultaneously reduce the velocity of the flow of the products of combustion to such that entrained particles are facilitated being removed from the flow of the products of combustion.

12. A gasification system in accordance with claim 8 further comprising a spray of water through which the flow of the products of combustion are channeled to at least one of desuperheat the products of combustion, amalgamate particles entrained in the products of combustion, and vaporize at least a portion of the spray.

13. A gasification system in accordance with claim 8 further comprising a bottom shell assembly comprising a bottom shell, said sump within said bottom shell, and said lockhopper adjacent said sump and oriented in alignment with an outlet of said combustor, said sump and said lockhopper coupled in flow communication by a gap between said bottom shell and a sidewall of said lockhopper.

* * * * *